United States Patent
Guerra et al.

(10) Patent No.: US 9,252,979 B2
(45) Date of Patent: Feb. 2, 2016

(54) TRANSPARENT CONFIGURATION OF VIRTUAL HOSTS SUPPORTING MULTIPLE TIME ZONES IN AN ENTERPRISE PLATFORM

(75) Inventors: J. Michael Guerra, Littleton, CO (US); Steven M. Fillipi, Aurora, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 424 days.

(21) Appl. No.: 13/460,304

(22) Filed: Apr. 30, 2012

(65) Prior Publication Data

US 2013/0086230 A1    Apr. 4, 2013

Related U.S. Application Data

(60) Provisional application No. 61/542,183, filed on Oct. 1, 2011.

(51) Int. Cl.
*H04L 12/64* (2006.01)
*H04L 29/06* (2006.01)
*H04L 29/12* (2006.01)

(52) U.S. Cl.
CPC ........ *H04L 12/6418* (2013.01); *H04L 61/2517* (2013.01); *H04L 63/0272* (2013.01); *H04L 69/28* (2013.01); *H04L 29/12028* (2013.01)

(58) Field of Classification Search
CPC ... H04L 12/66; H04L 41/5012; H04L 43/106; H04L 29/12028; H04L 61/2517; H04L 41/0816; H04L 63/0272; H04L 69/28

USPC .................................................. 709/220, 231
See application file for complete search history.

(56) References Cited

U.S. PATENT DOCUMENTS

| | | | | |
|---|---|---|---|---|
| 5,999,525 | A * | 12/1999 | Krishnaswamy et al. | 370/352 |
| 6,295,541 | B1 * | 9/2001 | Bodnar et al. | |
| 6,909,708 | B1 * | 6/2005 | Krishnaswamy et al. | 370/352 |
| 7,970,923 | B2 * | 6/2011 | Pedersen et al. | 709/231 |
| 8,560,819 | B2 | 10/2013 | Fillipi et al. | |
| 2013/0191241 | A1 | 7/2013 | Fillipi et al. | |
| 2014/0013092 | A1 | 1/2014 | Fillipi et al. | |

OTHER PUBLICATIONS

"Port forwarding", Wikipedia, 3 pages, Feb. 14, 2012.
"Routing table", Wikipedia, 3 pages, Oct. 29, 2011.

\* cited by examiner

*Primary Examiner* — Kristie Shingles
(74) *Attorney, Agent, or Firm* — Vista IP Law Group, LLP

(57) ABSTRACT

A method, system, and computer program product for transparent configuration of virtual hosts to support timestamping of documents that are processed in multiple time zones within an enterprise platform. Embodiments use network address translation and virtual host initialization techniques to configure a port listener such that the port listener receives IP packets from the network interface and uses the subnet's network address IP address to map to a time zone correspondence. When the identified time zone corresponds to a first time zone, then the port listener forwards the IP packet to a first virtual host process that has been initialized with a first time zone virtual time clock used for timestamping. When the identified time zone corresponds to a second time zone, the port listener forwards the IP packet to a second virtual host process that has been initialized with a second time zone virtual time clock used for timestamping.

17 Claims, 8 Drawing Sheets

TRANSPARENT CONFIGURATION OF VIRTUAL HOSTS SUPPORTING MULTIPLE TIME ZONES IN AN ENTERPRISE PLATFORM

RELATED APPLICATIONS

The present application claims the benefit of priority to U.S. Provisional Patent Application Ser. No. 61/542,183, entitled "Timezone Support for Enterprise Platforms", filed on Oct. 1, 2011, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of configuration of database transaction systems and more particularly to techniques for transparent configuration of virtual hosts supporting multiple time zones in an enterprise platform.

BACKGROUND

Some embodiments of the present disclosure are directed to an improved approach for implementing configuration of virtual hosts supporting multiple time zones in an enterprise platform.

In a global enterprise setting, records of transactions need to be timestamped based on the time in the locale where the transaction is performed. A legacy approach has been to deploy a local server (e.g., a physical server such as computer with an operating system) in each time zone where a transaction is performed, assign a user to log into that local server, and timestamp the record of the transaction with the timestamp of the time at that local server. Thus, the timestamp on the transaction reflects the local time zone (i.e., the time zone where the transaction is performed).

Legacy approaches serve some of the aforementioned purposes, though they have other unwanted effects, which unwanted effects are often tied to the deployment of the time zone server itself. For instance, each time zone server has associated costs stemming from maintenance costs of the physical server hardware, deployment and maintenance costs for add-on software (e.g., compilers, add-on modules), as well as associated costs stemming from total cost of ownership (e.g., downtime due to reliability, downtime due to software updates, IT maintenance, etc.). Moreover, this legacy approach could require one server for each time zone in which transactions need to be timestamped. This can add significantly to the cost of doing business, especially in a global enterprise setting.

The aforementioned legacy approach not only requires time zone-specific servers, it also does not have the capability to perform transparent configuration of virtual hosts and the applications running on said servers. Therefore, there is a need for an improved approach.

SUMMARY

The present disclosure provides an improved method, system, and computer program product suited to address the aforementioned issues with legacy approaches. More specifically, the present disclosure provides a detailed description of techniques used in methods, systems, and computer program products for transparent configuration of virtual hosts supporting multiple time zones in an enterprise platform.

Embodiments of the present disclosure can use unmodified application software, and embodiments use network address translation and virtual host initialization techniques to configure a port listener such that the port listener receives IP packets from the network interface and uses the subnet's network address IP address (and port) to map to a time zone correspondence. When the identified time zone corresponds to a first time zone, then the port listener forwards the IP packet to a first virtual host process that has been initialized with a first time zone virtual time clock used for timestamping. When the identified time zone corresponds to a second time zone, then the port listener forwards the IP packet to a second virtual host process that has been initialized with a second time zone virtual time clock used for timestamping.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

DETAILED DESCRIPTION

Figure 1A:
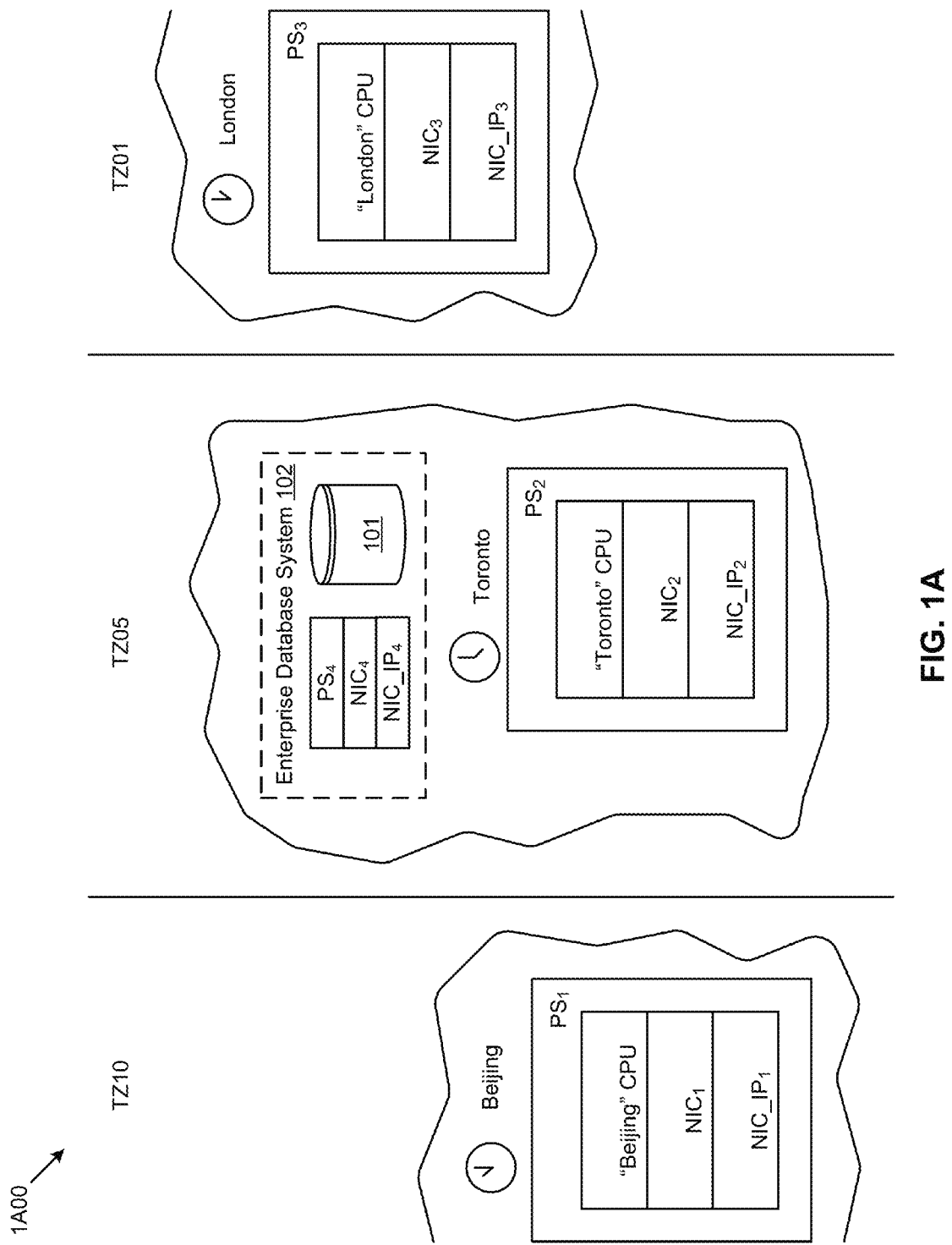
FIG. 1A depicts a global deployment environment prepared for transparent configuration of virtual hosts supporting multiple time zones in an enterprise platform, according to some embodiments.

Some embodiments of the present disclosure are directed to an improved approach for implementing transparent configuration of virtual hosts supporting multiple time zones in an enterprise platform. More particularly, disclosed herein are environments, methods, and systems for implementing transparent configuration of virtual hosts supporting multiple time zones without modification of the enterprise applications that run under the virtual hosts.

Overview

In a global enterprise setting, records of transactions need to be timestamped based on the time in the locale where the transaction is performed. A legacy approach has been to deploy a local server (e.g., a physical server such as a computer with an operating system) in each time zone where a transaction is performed, assign a user to log into that local server, and timestamp the record of the transaction with the timestamp of the local server. Thus, the timestamp on the transaction reflects the local time zone (i.e., the time zone where the transaction is performed).

Some legacy approaches permit a user to configure a time zone directly from within an application that needs time zone support (e.g., by requiring a user to modify the application code base or configuration parameters). What's needed are techniques to permit operation of an unmodified instance of the application that has built-in, user-configurable time zone support to operate with time zone support even when the user does not modify the application to set a time zone. Other legacy approaches deploy a physical time zone server. While the legacy approaches serve certain purposes, they have unwanted effects, which unwanted effects are often tied to the deployment of the time zone server itself. For instance, each physical time zone server has associated costs stemming from maintenance costs of the physical server hardware, deployment and maintenance costs for add-on software (e.g., compilers, add-on modules), as well as associated costs stemming from total cost of ownership (e.g., downtime due to reliability, downtime due to software updates, IT maintenance, etc.). Moreover, this legacy approach could potentially require one or more servers for each time zone in which transactions need to be timestamped. This can add significantly to the cost of doing business in a global enterprise setting.

Worse, in some cases, in order to support multiple time zones, the deployer may need to support multiple time zone-specific server roles for each desired time zone. In some cases more than one physical time zone-specific server was needed to be deployed (e.g., a time zone-specific enterprise server and a time zone-specific HTML server), even further adding unwanted expense.

Other legacy approaches rely on updating the application software running on an enterprise server, such that the application software reads some indication of the intended time zone. However, since this legacy approach relies on a software update (e.g., a new version, or a patch) implementing such a legacy approach adds undesired costs (e.g., for implementing the changes in the application software code base), undesired complexity (e.g., at least since the additional application software versions have to be managed), and risk of downtime (e.g., since in at least some situations new application software images need to be started).

As used throughout this document, the term "virtual host" refers to a concept whereby a virtual IP address is created and associated with a virtual hostname entry on a single operating system image. The creation of a virtual IP address and virtual hostname entry do not require additional hardware. Both are able to operate with a single NIC adapter. In embodiments, a NIC adapter driver (or equivalent operating system function) performs the network address translation to route network traffic to and from the appropriate virtual IP address.

Also as used throughout this document, the term "enterprise server" refers to a server whose role is to execute application program logic.

Also as used throughout this document, the term "HTML server" refers to a server whose role is to provide a presentation layer (e.g., graphic user interface) to an end-user.

Some implementations can combine the two roles of an "enterprise server" and an "HTML server" (as defined above) into a single server role.

Embodiments of the present disclosure can use unmodified application software, and embodiments use network address translation and virtual host initialization techniques to configure a port listener such that the port listener receives IP packets from the network interface and uses the subnet's network address IP address (and port) to map to a time zone correspondence. When the identified time zone corresponds to a first time zone, then the port listener forwards the IP packet to a first virtual host process that has been initialized with a first time zone virtual time clock used for timestamping. When the identified time zone corresponds to a second time zone, then the port listener forwards the IP packet to a second virtual host process that has been initialized with a second time zone virtual time clock used for timestamping.

Descriptions of Exemplary Embodiments

FIG. 1A depicts a global deployment environment 1A00 prepared for transparent configuration of virtual hosts supporting multiple time zones in an enterprise platform. As an option, the present global deployment environment 1A00 may be implemented in the context of the architecture and functionality of the embodiments described herein.

As shown, the global deployment environment includes three time zones (e.g., time zone TZ10, time zone TZ05, and time zone TZ01). And, in each time zone there is a physical server (e.g., physical server $PS_1$, physical server $PS_2$, physical server $PS_3$). Each physical server has its respective CPU name (e.g., "Beijing", "Toronto", "London"), and each physical server has its respective network interface card (NIC) and IP address. Further, the global deployment environment includes an enterprise database system 102 for storing data including timestamped transaction records into a database stored in a non-volatile storage device 101.

As earlier indicated, as business functions are executed and data (e.g., transactions) are written to the database, a transaction's date-time stamp can be based upon a time clock. As shown, each physical server has its respective time clock (e.g., Beijing time zone clock, Toronto time zone clock, London time zone clock), and the respective time zone clock is used to facilitate a transaction's date-time stamp. As shown in the heretofore-described figures, time stamping techniques can be implemented by using virtual hosts; more specifically, using virtual hosts that have virtual time zone clocks.

Some of the herein-disclosed virtual host and virtual time zone clock techniques rely in part on built-in operating system capabilities. For example, a UNIX operating system, or a Microsoft Windows™ operating system (and others) support the notion of a virtual host (also called virtual hosts), and the notion of a virtual IP address, and further, the notion of "services" that "listen" on a port of a NIC. And, such operating systems support the binding of a particular service to a particular set of characteristics supported by the operation system (e.g., an IP address, a port, a hostname, a virtual IP address, etc.). Even further, a particular "server service" can be "started" or initiated by the occurrence of a user log-in event, and the log-in event can in turn cause the started services to read initialization files to further establish binding characteristics.

In exemplary embodiments, it is possible to run multiple virtual time zone clocks on the same physical server (e.g., on a single physical server with a single operating system image) while using a common listener port (e.g., via a bound IP port). This is done by using a server operating system's ability to address virtual hostnames and virtual network IP addresses while still addressing a particular server by a specific 'logical' name (e.g., a name in a cluster), and by passing time zone definitions to applicable services. Such techniques are described in further detail below.

Managing user accounts such that a particular user can be associated with a particular locale, and further can be associated with a particular time zone (e.g., the time zone of the locale, or a time zone offset from GMT, etc.) can be accomplished in many ways. One way is to record the associations in a user record. In some cases, an application (e.g., an enterprise software application) can access a user record, and from that record, determine a time zone offset. Yet, other techniques, many of which are disclosed in the following several figures, can reduce or eliminate reliance on an application's ability (or lack of ability) to access and process a user record.

Figure 1B:
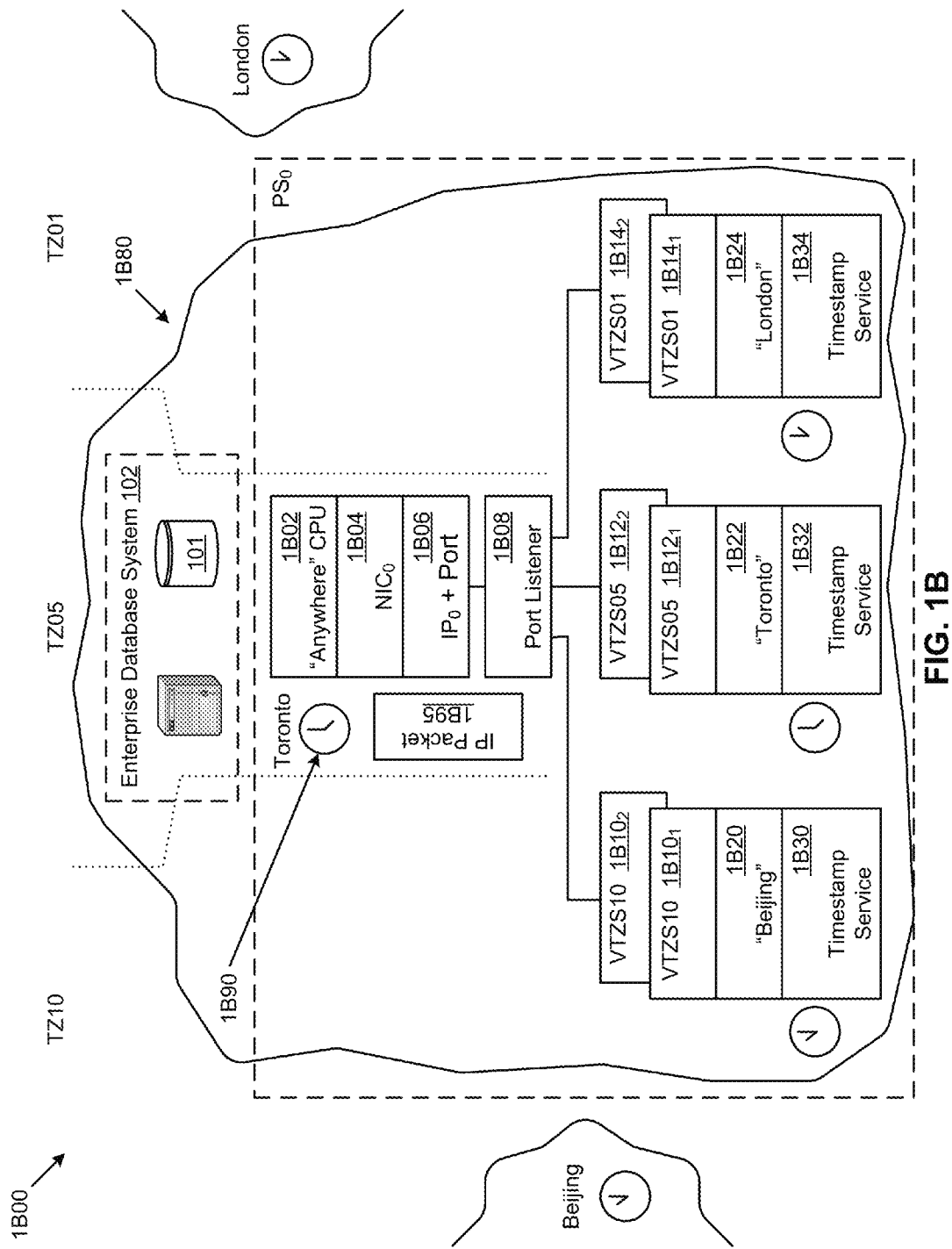
FIG. 1B depicts a global deployment environment employing transparent configuration of virtual hosts supporting multiple time zones in an enterprise platform, according to some embodiments.

FIG. 1B depicts a global deployment environment 1B00 employing transparent configuration of virtual hosts supporting multiple time zones in an enterprise platform. As an option, the present global deployment environment 1B00 may be implemented in the context of the architecture and functionality of the embodiments described herein. Also, the global deployment environment 1B00 or any aspect therein may be implemented in any desired environment.

As shown, the global deployment environment 1B00 includes an enterprise platform 1B80 that services three time zones (e.g., time zone TZ10, time zone TZ05, and time zone TZ01).

The physical server $PS_0$ has a complement of server hardware, specifically, a CPU or multi-processor CPU (e.g., CPU 1B02), and a network interface (e.g., $NIC_0$ 1B04). The physical server $PS_0$ further comprises hardware and software in the form of a port forwarding table (e.g., port table 1B06), and a port listener 1B08.

Each time zone has associated virtual host processes (e.g., virtual host VTZS10 $1B10_1$, virtual host VTZS10 $1B10_2$, virtual host VTZS05 $1B12_1$, virtual host VTZS05 $1B12_2$, virtual host VTZS01 $1B14_1$, virtual host VTZS01 $1B14_2$). Each virtual host process has its respective virtual host name (e.g., Beijing 1B20, Toronto 1B22, London 1B24). In contrast to the global deployment environment 1A00, the global deployment environment 1B00 depicts that:

Each virtual host is hosted on a single physical server (shown as physical server $PS_0$);

Each virtual host does not comprise a network interface card (e.g., NIC); instead, each virtual host is assigned to a virtual IP address which connects to a shared instance of a port listener (shown as port listener 1B08) that receives IP packets from an instance of a network interface (e.g., $NIC_0$ 1B04).

Now, using the aforementioned operating system support, and specifically the operating system support of "server services", any server services can be associated with a time zone environment variable (or a 'locale' setting) that is in turn associated with the operating system user account. And an authorized user with a user account can be used to start the corresponding services. In exemplary cases, when these services are started, they will inherit the time zone attribute associated with the OS user account.

A virtual host is an example of the aforementioned "server service", and when these services are started they can be configured with attributes associated with the OS user account. Network traffic (for example, network traffic comprising IP packets 1B95) needs to be routed to the appropriate virtual host so that transaction records derived from or contained in the IP packets can be processed and timestamped. This routing can be accomplished using a lookup table, such as a routing table, possibly in combination with port forwarding.

Port forwarding (also known as port mapping) is a name given to the technique of:

1. Translating the address and/or port number of a packet to a new destination.
2. Accepting or rejecting such packets, possibly using a packet filter (e.g., firewall).
3. Forwarding the packet according to the routing table.

The new destination may be a predetermined network port on a host or the new destination may be a predetermined process (including a virtual host or other process). This technique of network address translation (NAT) is sometime called NAT-masquerading. In IP networks, the NAT technique is used to permit communications by external hosts with services provided within a private local area network. In the embodiment of global deployment environment 1B00, the NAT technique is used to permit communications by external hosts with the "server services" provided on physical server $PS_0$.

In other embodiments, time zone correspondence can be based on information in the IP packet in combination with a virtual IP address lookup table, or a user profile lookup table.

Figure 1C:
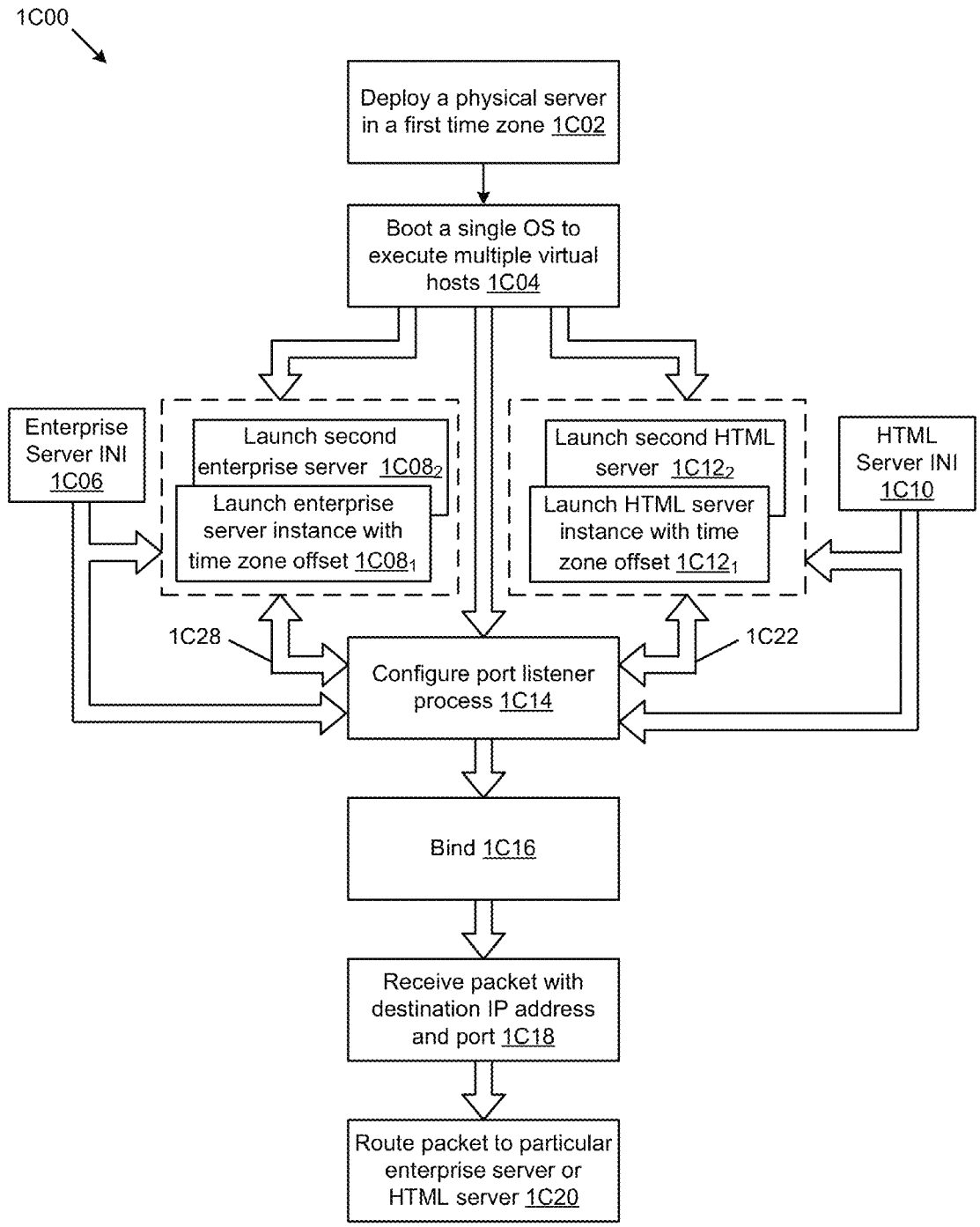
FIG. 1C depicts a flow diagram for implementing transparent configuration of virtual hosts supporting multiple time zones in an enterprise platform, according to some embodiments.

FIG. 1C depicts a flow diagram 1C00 for implementing transparent configuration of virtual hosts supporting multiple time zones in an enterprise platform. As an option, the present flow diagram 1C00 may be implemented in the context of the architecture and functionality of the embodiments described herein. Also, the flow diagram 1C00 or any aspect therein may be implemented in any desired environment.

As shown, the flow diagram 1C00 commences by deploying a physical server in a first time zone (see operation 1C02). The physical server can be a large machine (e.g., an enterprise database system 102) or the physical server can be merely a server capable of executing an operating system such as the ones heretofore described. The flow continues when the physical server boots a single OS to execute multiple virtual hosts (see operation 1C04). Once booted, the single OS launches a plurality of virtual host processes. In the embodiment shown, the single OS launches pairs of virtual host processes. Specifically, the single operating system launches an enterprise server instance with a time zone offset (see operation $1C08_1$ and operation $1C08_2$) and also launches an HTML server instance with a time zone offset (see operation $1C12_1$ and operation $1C12_2$). The enterprise server instance with a time zone offset can be configured with a particular time zone offset by using a user record (e.g., determined based upon a login event) and/or any parts of the shown enterprise server INI (see operation 1C06). The INI can be a file, or an environment variable, or a parameter. Similarly, the HTML server instance with a time zone offset can be configured with a particular time zone offset by using the shown HTML server INI (see operation 1C10).

The technique relies in part on a port listener, and steps are taken to configure a port listener process (see operation 1C14), where the port listener process is configured to receive an IP packet from the network interface and to identify a time zone correspondence based on information in the IP packet, possibly in conjunction with a port forwarding table. As earlier indicated, a port forwarding technique serves to forward the IP packet to a new destination according to the routing table, and the new destination may be a predetermined process.

Continuing, steps are taken to bind or otherwise associate virtual IP addresses to processes (see operation 1C16) such that when a packet is received at the physical server, it can be routed to an associated virtual host (e.g., an enterprise server instance or an HTML server instance). The bind operation can result in an entry into a port forwarding table, or it can result in the association of a virtual IP address to a process using another action equivalent to the bind. In the embodiment shown, the port listener is in communication with one or more respective virtual hosts via an intra-host communication path (see path 1C28 and path 1C22).

According to the flow diagram 1C00, port forwarding establishes the network traffic flow such that an IP packet received from the network interface (see operation 1C18) can be routed first to a port listener, and then to a server instance with a time zone offset (see operation 1C20). When the virtual IP address from an IP packet corresponds to a first time zone, the port listener forwards the IP packet to a first time zone virtual host process; when the virtual IP address from the an IP packet corresponds to a second time zone, then the port listener forwards the IP packet to at least one second time zone virtual host process.

Figure 2:
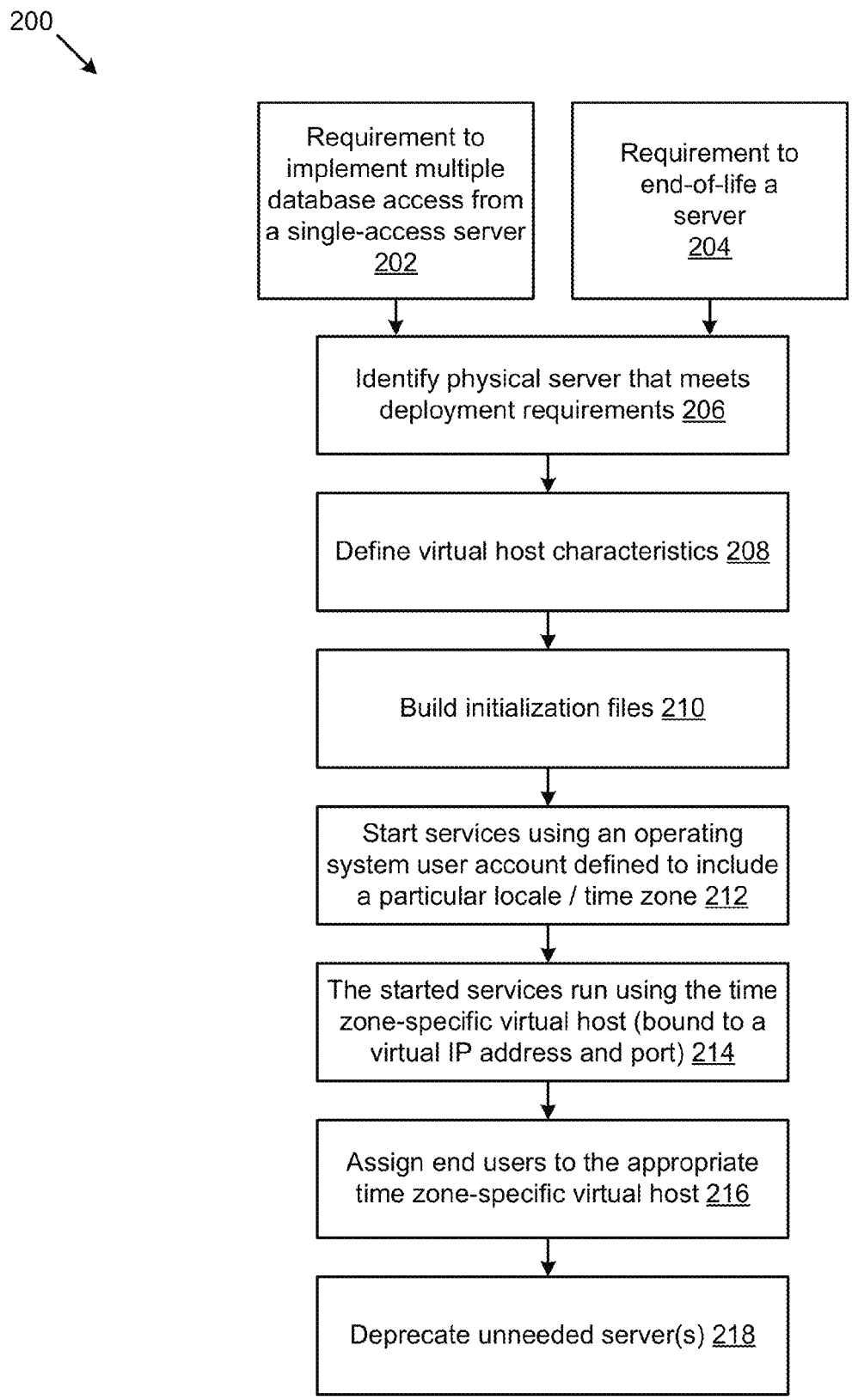
FIG. 2 depicts a virtual host time zone support methodology for implementing transparent configuration of virtual hosts supporting multiple time zones in an enterprise platform, according to some embodiments.

FIG. 2 depicts a virtual host time zone support methodology 200 for implementing transparent configuration of virtual hosts supporting multiple time zones in an enterprise platform. As an option, the present methodology may be implemented in the context of the architecture and functionality of the embodiments described herein.

The methodology 200 for implementing transparent configuration of virtual hosts supporting multiple time zones in an enterprise platform depicts but one possible technique, and other techniques can be used in addition to or instead of some of the techniques of methodology 200.

As shown, the virtual host time zone support methodology 200 might begin upon receipt of a requirement. The requirement might come from a need to support multiple database access from a single access server (see requirement 202), or it might come from the intent to deprecate a server that had been used as a time zone server (see requirement 204). Steps proceed upon identification of a physical server (see operation 206) and a deployment team or IT personnel might define virtual host characteristics (see operation 208) possibly resulting in the initialization characteristics used as an enterprise server INI (referring again to operation 1C06) and/or the initialization characteristics used as an HTML server INI (referring again to operation 1C10). In some embodiments, these INI files may define the linkage to a particular time zone-specific virtual hostname. In the case that the INI is in the form of initialization, then the initialization files are built (see operation 210). For example, in some cases of a single operation system of the variety heretofore described, the operating system might support sufficient data items (e.g., a system user account data item) to provide some or all of the needed initialization characteristics. In other cases, an application-specific file such as an INI initialization file is used.

Using any known technique, the needed services are started on the identified physical server (see operation 206) and the virtual hosts (see operation 212) are initialized using an operating system user account defined to a particular locale/time zone. The services (including a timestamp service) run using the time zone-specific virtual host associated with a specific virtual IP address and port (see operation 214). End users of a particular time zone are assigned to the service associated to their time zone virtual host (see operation 216). Finally, any unneeded servers can be deprecated (see operation 218).

Figure 3:
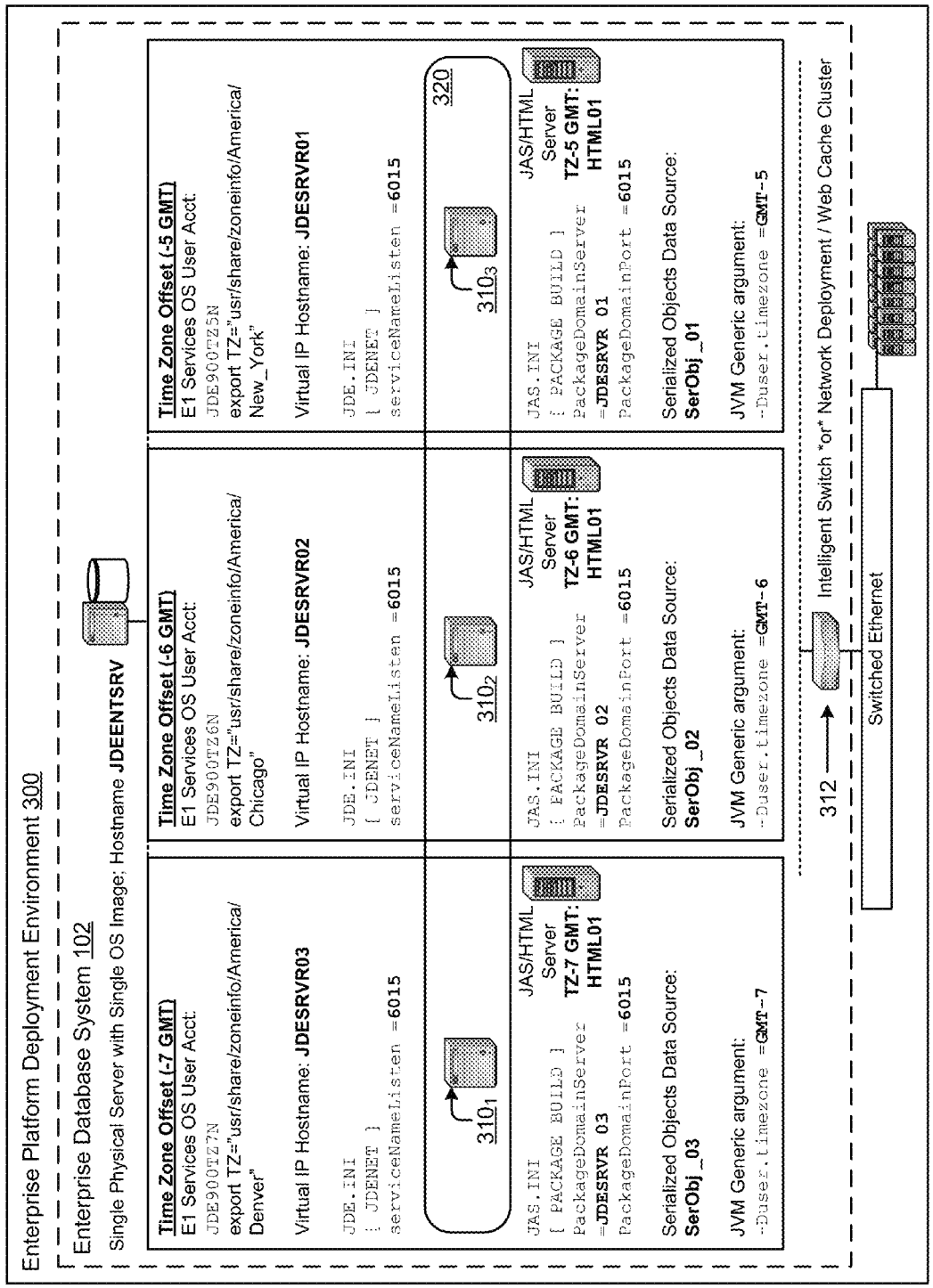
FIG. 3 depicts an enterprise platform deployment environment using transparent configuration of virtual hosts supporting multiple time zones in an enterprise platform, according to some embodiments.

FIG. 3 depicts an enterprise platform deployment environment 300 using transparent configuration of virtual hosts supporting multiple time zones in an enterprise platform. As an option, the present environment may be implemented in the context of the architecture and functionality of the embodiments described herein.

The deployment depicts a specific implementation where the time zone-specific services are launched on the physical server that hosts an enterprise database system 102. More particularly, the virtual host processes (e.g., JDESRVR03 $310_3$, JDESRVR02 $310_2$, JDESRVR01 $310_1$), and the HTML servers (e.g., JAS/HTML servers, as shown) are all launched from the single operating system 320, and each image is associated (e.g., via a bind operation) with a port listener process, where the port listener process is configured to receive an IP packet from the network interface (e.g., the intelligent switch, or the web cache cluster network interface) and forwards the IP packet based on a time zone correspondence. In other configurations, the port listener is a function within an Ethernet switch (e.g., intelligent switch 312 or other switch).

The JAS/HTML servers can be implemented in a given partition, and the desired time zone for each JAS/HTML server can be set via an HTML instance-specific Java argument. Thus multiple JAS/HTML instances, each with a unique time zone, can exist on a single physical server. Each enterprise server and HTML server combination is coupled via a setting in an initialization file (e.g., a JAS.INI file, as shown).

A user is assigned to a particular enterprise server. In enterprise deployments, the assigned user's user role is assigned to an environment such that the assigned mapping serves to associate the user's time zone to a specific enterprise server.

When a transaction is performed and the record of the transaction is written to the database, the transaction record's date-time stamp is based upon an enterprise server's timestamp service (e.g., see FIG. 1B, specifically timestamp service 1B30, timestamp service 1B32, timestamp service 1B34), which in turn is based on (e.g., relative to) the time clock 1B90 of the hosting physical server.

In some embodiments, an enterprise server is formed of a system foundation instance that can be configured to share a common network port as follows:

1. The physical server on which the system foundation instances are installed is given a virtual IP address and operating system user account created for each supported time zone.
2. A virtual hostname is created and assigned to each time zone-specific virtual IP address.
3. The initialization file (e.g., JDE.INI) for each installed foundation is configured to direct its server network traffic to a time zone-specific virtual hostname such that the system foundation instance is assigned to a time zone-specific OS user account.
4. For integrating the virtual host or virtual hosts, an 'Add Server' plan can be created and executed for each added virtual hostname.
5. Additional processor code is provided to support server logic to execute while remaining 'scoped' to a particular virtual hostname.

Figure 4:
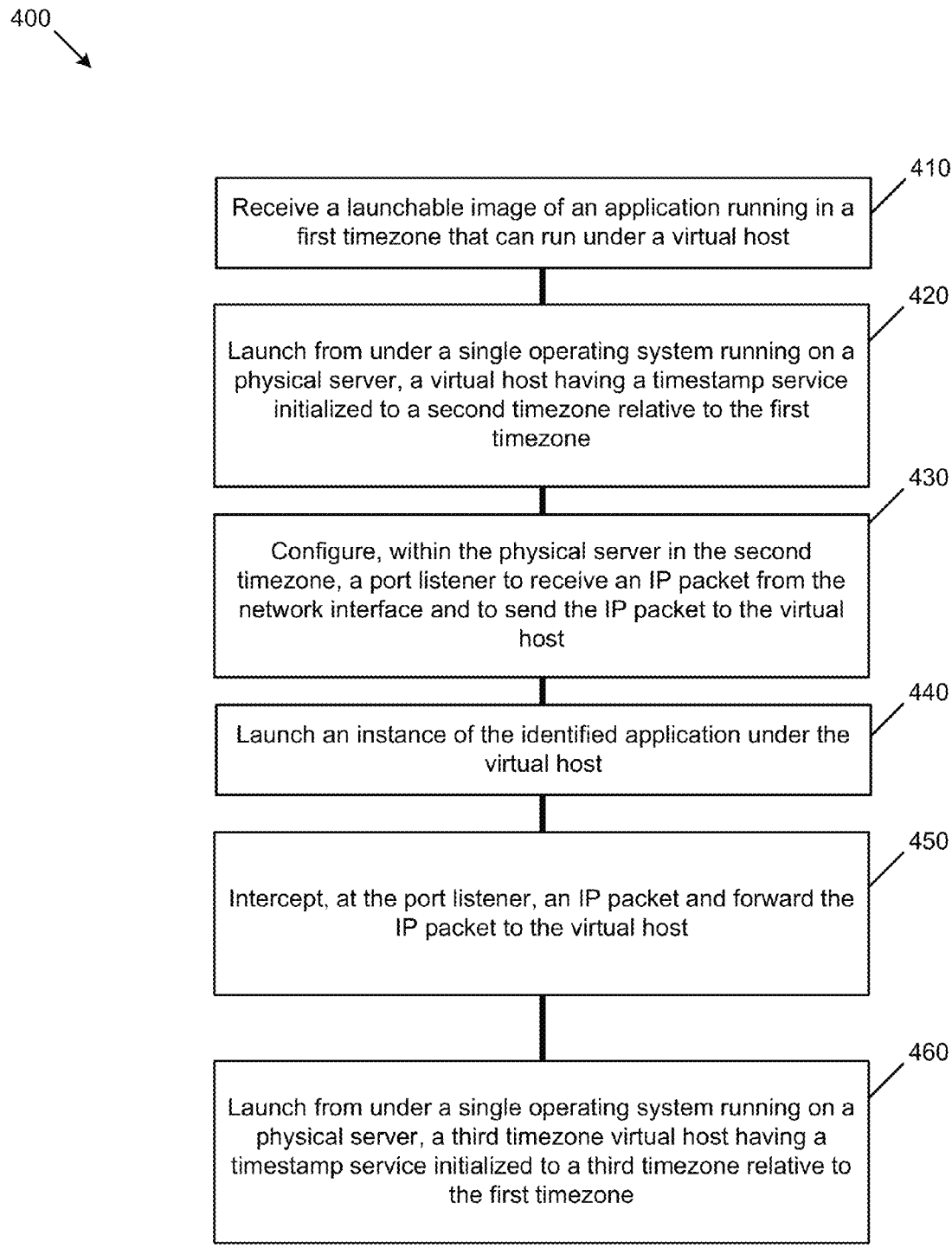
FIG. 4 depicts a system for transparent configuration of virtual hosts supporting multiple time zones in an enterprise platform, according to some embodiments.

FIG. 4 depicts a system 400 for transparent configuration of virtual hosts supporting multiple time zones in an enterprise platform. As an option, the present system may be implemented in the context of the architecture and functionality of the embodiments described herein.

In some embodiments, and as shown, an agent, possibly an IT professional, can identify an application running in a first time zone, and can invoke a module of an embodiment to receive a launchable image of an application running in a first time zone where that launchable image can run under a virtual host (see operation 410).

What is desired, and is implemented as described herein, is a technique wherein the time zone management can be performed external to the application such that the code of the application need not be altered—and yet the application receives timestamping services corresponding to a different time zone (e.g., a second time zone other than the first time zone).

To accomplish this, a physical server can be identified, and a virtual host can be launched, from under a single operating system running on the identified physical server (see operation 420). In exemplary embodiments, such a virtual host comprises a timestamp service that is initialized to a second time zone relative to the first time zone (also see operation 420).

Aspects of the single operating system running on the identified physical server can be configured, within the physical server in the second time zone, such that a port listener or equivalent operating system function can receive an IP packet from the network interface and to send the IP packet to the virtual host (see operation 430). Since the virtual host comprises a timestamp service that has been initialized to a second time zone relative to the first time zone, an application running under the virtual host will receive timestamping services corresponding to timestamping services of the second time zone. The unaltered application image is launched under the virtual host (see operation 440), and processing continues such that the port listener performs intercepting an IP packet destined for the application and forwards the intercepted IP packet to the virtual host (see operation 450).

As depicted, the application image (e.g., the image of the application running in the first time zone) had not been altered, and yet the timestamping services from within the virtual host provide a timestamp of the second time zone, and the desired second time zone timestamp is applied to certain data items processed by the unaltered application.

This procedure can be repeated for additional (e.g., second, or third, or Nth) application images, and for other time zones. For example, it is possible to launch from under a single operating system running on a physical server, another virtual host having a timestamp service initialized to a third time zone relative to the first time zone (see operation 460), and thus, the additional application image running under the another virtual host uses the timestamping services of the third time zone, and the desired third time zone timestamp is applied to certain data items processed by the unaltered application.

ADDITIONAL EMBODIMENTS OF THE DISCLOSURE

Figure 5:
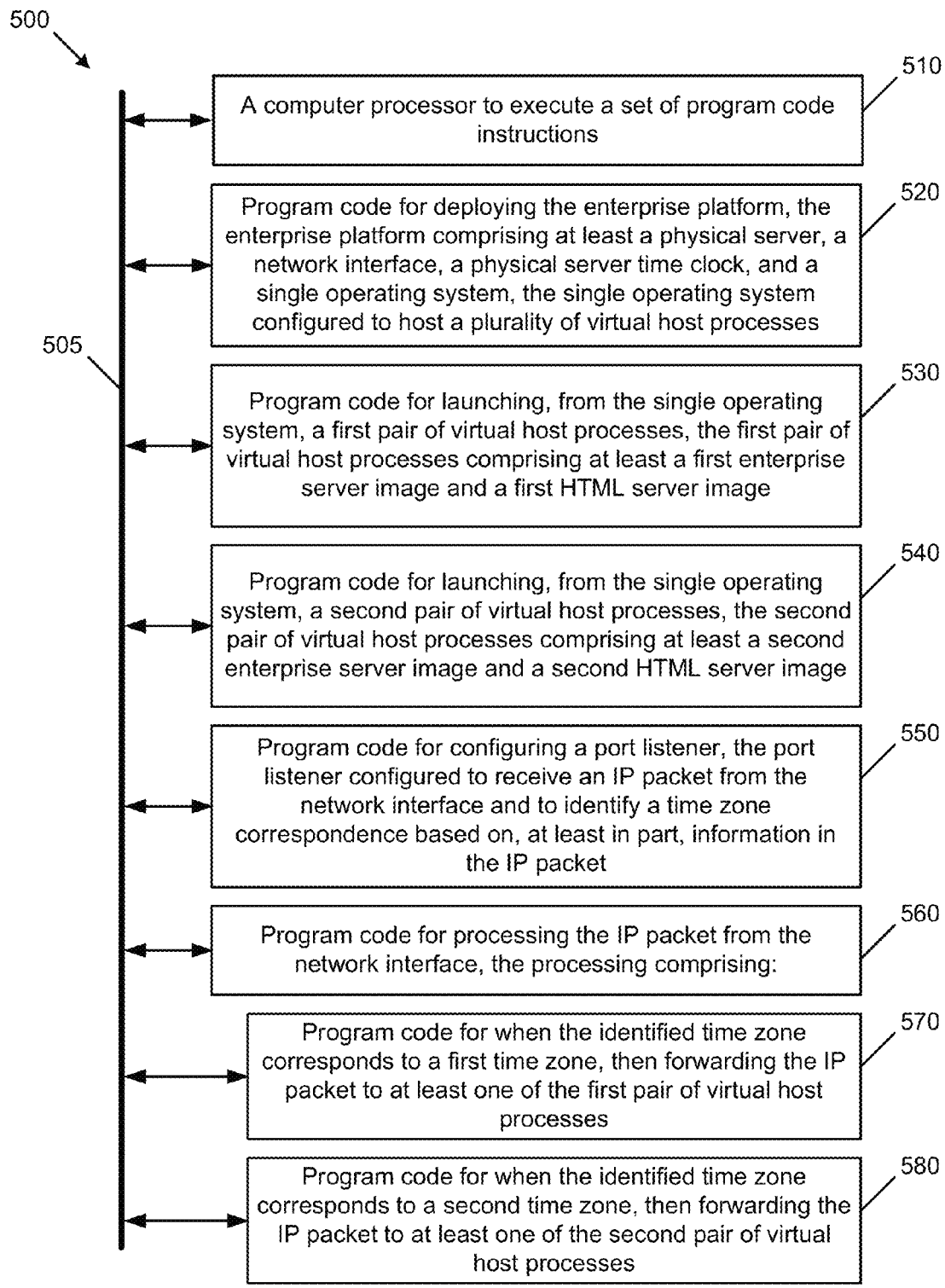
FIG. 5 depicts a networked system for transparent configuration of virtual hosts supporting multiple time zones in an enterprise platform, according to some embodiments.

FIG. 5 depicts a networked system for transparent configuration of virtual hosts supporting multiple time zones in an enterprise platform, according to some embodiments. As an option, the present system 500 may be implemented in the context of the architecture and functionality of the embodiments described herein. Of course, however, the system 500 or any operation therein may be carried out in any desired environment.

As shown, system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims. The embodiment of FIG. 5 implements a portion of a computer system, shown as system 500, comprising a computer processor to execute a set of program code instructions (see module 510) and modules for accessing memory to hold program code instructions to perform: deploying the enterprise platform, the enterprise platform comprising at least a physical server, a network interface, a physical server time clock, and a single operating system, the single operating system configured to host a plurality of virtual host processes (see module 520); launching, from the single operating system, a first pair of virtual host processes, the first pair of virtual host processes comprising at least a first enterprise server image and a first HTML server image (see module 530); launching, from the single operating system, a second pair of virtual host processes, the second pair of virtual host processes comprising at least a second enterprise server image and a second HTML server image (see module 540); configuring a port listener, the port listener configured to receive an IP packet from the network interface and to identify a time zone correspondence based on, at least in part, information in the IP packet (see module 550); processing the IP packet from the network interface, the processing comprising (see module 560) determining when the identified time zone corresponds to a first time zone, then forwarding the IP packet to at least one of the first pair of virtual host processes (see module 570); and determining when the identified time zone corresponds to a second time zone, then forwarding the IP packet to at least one of the second pair of virtual host processes (see module 580).

SYSTEM ARCHITECTURE OVERVIEW

Figure 6:
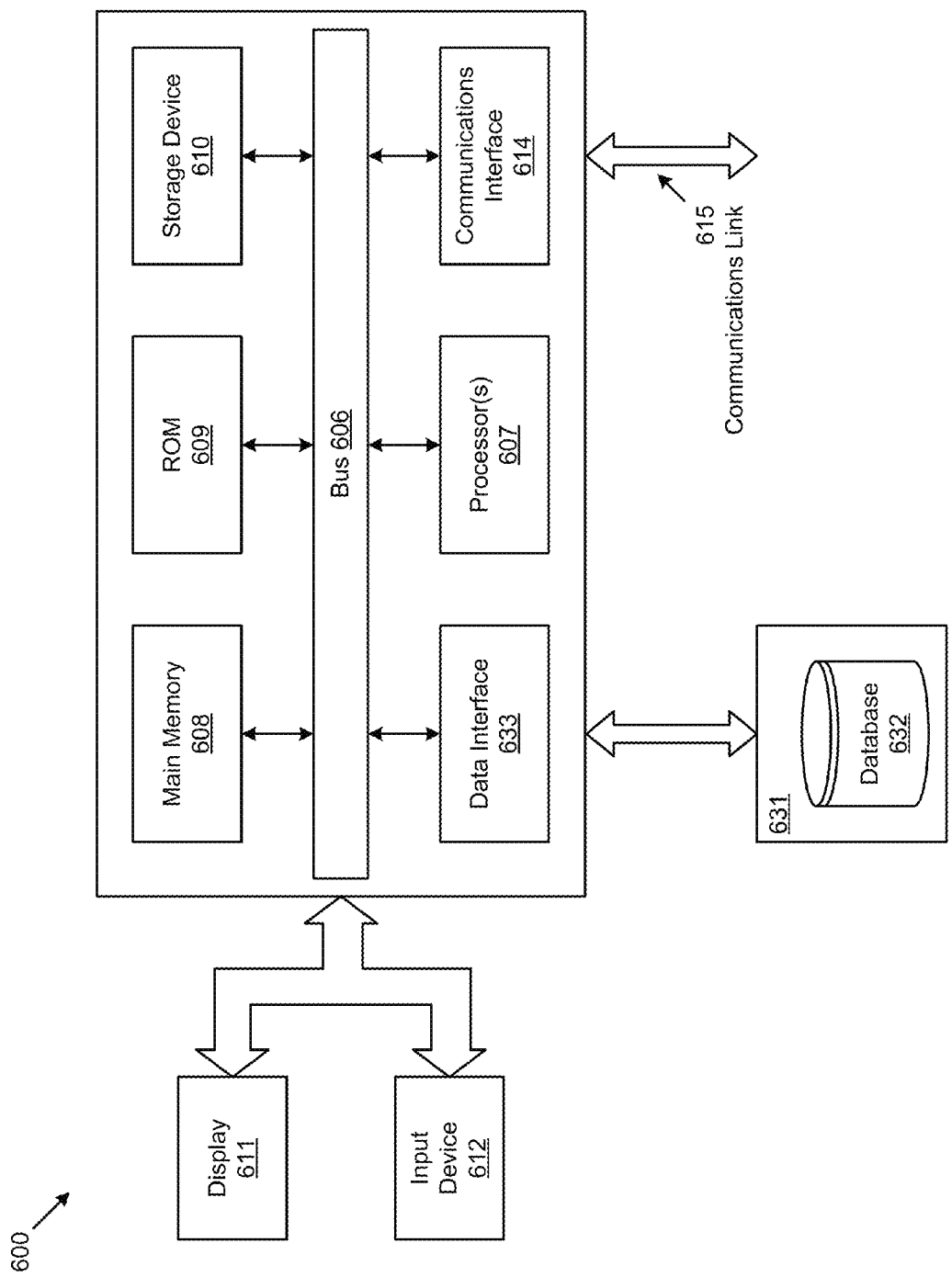
FIG. 6 depicts a block diagram of an instance of a computer system suitable for implementing an embodiment of the present disclosure.

FIG. 6 depicts a block diagram of an instance of a computer system 600 suitable for implementing an embodiment of the present disclosure. Computer system 600 includes a bus 606 or other communication mechanism for communicating information, which interconnects subsystems and devices, such as a processor 607, a system memory 608 (e.g., RAM), a static storage device (e.g., ROM 609), a disk drive 610 (e.g., magnetic or optical), a data interface 633, a communication interface 614 (e.g., modem or Ethernet card), a display 611 (e.g., CRT or LCD), input devices 612 (e.g., keyboard, cursor control), and an external data repository 631.

According to one embodiment of the disclosure, computer system 600 performs specific operations by processor 607 executing one or more sequences of one or more instructions contained in system memory 608. Such instructions may be read into system memory 608 from another computer readable/usable medium, such as a static storage device or a disk drive 610. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 600. According to other embodiments of the disclosure, two or more computer systems 600 coupled by a communication link 615 (e.g., LAN, PTSN, or wireless network) may perform the sequence of instructions required to practice the disclosure in coordination with one another.

Computer system 600 may transmit and receive messages, data, and instructions, including programs (e.g., application code), through communication link 615 and communication interface 614. Received program code may be executed by processor 607 as it is received, and/or stored in disk drive 610 or other non-volatile storage for later execution. Computer system 600 may communicate through a data interface 633 to a database 632 on an external data repository 631. A module as used herein can be implemented using any mix of any portions of the system memory 608, and any extent of hard-wired circuitry including hard-wired circuitry embodied as a processor 607.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for transparent configuration of virtual hosts supporting multiple time zones, the method comprising:
   launching, on a physical server in a first time zone, a plurality of virtual hosts configured as servers having timestamp services initialized to time zones different than the first time zone;
   launching an application from within one or more of the virtual hosts;
   configuring, on the physical server, a port listener to receive an IP packet from a network interface and to identify a time zone correspondence based on, at least in part, mapping information in the IP packet using a lookup table; and
   intercepting, at the port listener, the IP packet from the network interface to forward the IP packet to at least one or more of the virtual hosts.

2. The method of claim 1, wherein the lookup table is a virtual IP address lookup table.

3. The method of claim 1, wherein the lookup table is a network address translation lookup table.

4. The method of claim 1, wherein the lookup table is a user profile lookup table.

5. The method of claim 1, wherein the port listener is bound to an IP port.

6. The method of claim 1, wherein an unmodified instance of the application has built-in user-configurable time zone support.

7. A computer system for transparent configuration of virtual hosts supporting multiple time zones, comprising:
   a computer processor to execute a set of program code instructions; and
   a memory to hold the program code instructions, in which the program code instructions comprises program code to perform,
   launching, on a physical server in a first time zone, a plurality of virtual hosts configured as servers having timestamp services initialized to time zones different than the first time zone;
   launching an application from within one or more of the virtual hosts;
   configuring, on the physical server, a port listener to receive an IP packet from a network interface and to identify a time zone correspondence based on, at least in part, mapping information in the IP packet using a lookup table; and
   intercepting, at the port listener, the IP packet from the network interface to forward the IP packet to at least one or more of the virtual hosts.

8. The computer system of claim 7, wherein the lookup table is a virtual IP address lookup table.

9. The computer system of claim 7, wherein the lookup table is a network address translation lookup table.

10. The computer system of claim 7, wherein the lookup table is a user profile lookup table.

11. The computer system of claim 7, wherein the port listener is bound to an IP port.

12. The computer system of claim 7, wherein an unmodified instance of the application has built-in user-configurable time zone support.

13. A computer program product embodied in a non-transitory computer readable medium, the computer readable medium having stored thereon a sequence of instructions which, when executed by a processor causes the processor to execute a process to implement transparent configuration of virtual hosts supporting multiple time zones, the process comprising:
   launching, on a physical server in a first time zone, a plurality of virtual hosts configured as servers having timestamp services initialized to time zones different than the first time zone;
   launching an application from within one or more of the virtual hosts;
   configuring, on the physical server, a port listener to receive an IP packet from a network interface and to identify a time zone correspondence based on, at least in part, mapping information in the IP packet using a lookup table; and
   intercepting, at the port listener, the IP packet from the network interface to forward the IP packet to at least one or more of the virtual hosts.

14. The computer program product of claim 13, wherein the lookup table is a virtual IP address lookup table.

15. The computer program product of claim 13, wherein the lookup table is a network address translation lookup table.

16. The computer program product of claim 13, wherein the lookup table is a user profile lookup table.

17. The computer program product of claim 13, wherein an unmodified instance of the application has built-in user-configurable time zone support.

* * * * *